US009587516B2

(12) United States Patent
Fabre et al.

(10) Patent No.: US 9,587,516 B2
(45) Date of Patent: Mar. 7, 2017

(54) FAN COWL LOCKING SYSTEM

(71) Applicant: Airbus Operations (SAS), Toulouse (FR)

(72) Inventors: Christian Fabre, Tournefeuille (FR); Alain Bignolais, Leguevin (FR)

(73) Assignee: Airbus Operations (SAS), Toulouse (FR)

( * ) Notice: Subject to any disclaimer, the term of this patent is extended or adjusted under 35 U.S.C. 154(b) by 175 days.

(21) Appl. No.: 14/575,379

(22) Filed: Dec. 18, 2014

(65) Prior Publication Data

US 2015/0184544 A1 Jul. 2, 2015

Related U.S. Application Data

(60) Provisional application No. 61/922,968, filed on Jan. 2, 2014.

(30) Foreign Application Priority Data

Jan. 2, 2014 (FR) .................................. 14 50002

(51) Int. Cl.
| | |
|---|---|
| *B64D 29/06* | (2006.01) |
| *F01D 25/24* | (2006.01) |
| *E05B 41/00* | (2006.01) |
| *E05C 19/14* | (2006.01) |

(Continued)

(52) U.S. Cl.
CPC .............. *F01D 25/24* (2013.01); *B64D 29/06* (2013.01); *E05B 11/02* (2013.01); *E05B 41/00* (2013.01); *E05C 19/145* (2013.01); *E05B 35/008* (2013.01); *Y10T 70/7486* (2015.04)

(58) Field of Classification Search
CPC ......... F01D 25/24; B64D 29/06; E05B 11/02; E05B 41/00; E05C 19/145
See application file for complete search history.

(56) References Cited

U.S. PATENT DOCUMENTS

| | | |
|---|---|---|
| 2,710,214 A | 6/1955 | Mills |
| 4,531,769 A * | 7/1985 | Glancy ................... E05C 19/14 292/113 |
| 4,613,099 A | 9/1986 | Smith et al. |
| | (Continued) | |

FOREIGN PATENT DOCUMENTS

| | | | |
|---|---|---|---|
| DE | 741677 | * 11/1943 | ............. E05C 19/10 |
| FR | 2852049 | 9/2004 | |

OTHER PUBLICATIONS

French Search Report, Sep. 23, 2014.

*Primary Examiner* — Justin Benedik
(74) *Attorney, Agent, or Firm* — Greer, Burns & Crain, Ltd.

(57) ABSTRACT

A locking system comprising a handle mounted such that it can rotate about an operating spindle, wherein the handle can move between a locked position and an unlocked position, a hook mounted on the handle and secured in rotation therewith, wherein the hook has a throat in which a latching point of a structure is designed to engage when the handle is in the locked position. The locking system comprises a key associated with the hook and by means of which it is possible to pass from the locked position to the unlocked position of the handle, wherein the key can be removed when the handle is in the locked position and cannot be removed when the handle is in the unlocked position.

19 Claims, 9 Drawing Sheets

(51) Int. Cl.
*E05B 11/02* (2006.01)
*E05B 35/00* (2006.01)

(56) References Cited

U.S. PATENT DOCUMENTS 5,518,206 A     5/1996  Arnold et al.
6,513,357 B2 *  2/2003  McCurry ............... E05B 11/00
                                              70/389

\* cited by examiner

FAN COWL LOCKING SYSTEM

CROSS-REFERENCES TO RELATED APPLICATIONS

This application claims the benefit of the French patent application No. 1450002 filed on Jan. 2, 2014, and the U.S. Provisional Patent Application Ser. No. 61/922,968, filed Jan. 2, 2014, the entire disclosures of which are incorporated herein by way of reference.

BACKGROUND OF THE INVENTION

The present invention relates to a system for locking fan cowls of an aircraft nacelle, to an aircraft nacelle comprising such a locking system, and to an aircraft comprising such a nacelle.

An aircraft comprises at least one nacelle which houses an engine, for example of the jet engine type, and which is suspended from a pylon. The nacelle generally comprises two fan cowls which may be opened so as to be able to carry out maintenance on the engine.

Each fan cowl is articulated about an opening axis parallel to the longitudinal axis of the nacelle and arranged in the upper part of the fan cowls, and the two fan cowls are arranged symmetrically on either side of the pylon.

Each fan cowl can thus move between a closed position, in which the fan cowl is arranged in the extension of the outer surface of the nacelle so as to cover the casing of the fan, and an open position, in which an operator has access to the engine.

The lower edges of the fan cowls, which are located in the lower part of the nacelle, are substantially contiguous in the closed position and are held in this locked position by multiple locking systems distributed along the contiguous lower edges of the fan cowls.

FIG. 1 shows a section through a locking system 50 of the prior art, between a first fan cowl 10 and a second fan cowl 20. The first fan cowl 10 bears a latching point 52, also called a "keeper", which is attached at the lower edge of the first fan cowl 10. The locking system 50 also comprises a hook 54 and a handle 58 which are mounted such that they can rotate with respect to one another about a rotation spindle 56.

The handle 58 and the hook 54 are mounted together and able to rotate, at the lower edge of the second fan cowl 20 via the intermediary of an articulation 62, about the rotation spindle 56. The articulation 62 consists of two articulated rods which are mounted so as to be able to rotate with respect to one another, and of which one is mounted so as to be able to rotate on the second fan cowl 20, the other bearing the handle 58/hook 54 assembly.

In the engaged position, the hook 54 receives the latching point 52 and the locking system 50 is locked when the handle is folded down between the fan cowls 10 and 20.

Before takeoff, an operator must check that the locking system 50 is properly engaged and locked. The fan cowls 10 and 20 tend to move toward one another under their own weight, and an operator may incorrectly assume, after a visual check, that the locking system is engaged and locked.

SUMMARY OF THE INVENTION

It is an object of the present invention to propose a locking system which does not have the drawbacks of the prior art and which in particular allows an operator to ensure, visually, that the locking system is indeed locked.

To that end, proposed here is a locking system comprising:
a handle which is mounted such that it can rotate about an operating spindle, wherein the handle can move between a locked position and an unlocked position,
a hook which is mounted on the handle and secured in rotation therewith, wherein the hook has a throat in which a latching point of a structure is designed to engage when the handle is in the locked position, and
a key which is associated with the hook and by means of which it is possible to pass from the locked position to the unlocked position of the handle, wherein the key can be removed when the handle is in the locked position and cannot be removed when the handle is in the unlocked position.

Such a locking system makes it possible to prevent the key from being removed while locking is incomplete and an operator can thus easily see that the locking system is not correctly locked as the key remains visible.

BRIEF DESCRIPTION OF THE DRAWINGS

The abovementioned features of the invention, as well as others, will emerge more clearly upon reading the following description of an exemplary embodiment, said description being given in relation to the appended drawings, in which.

DETAILED DESCRIPTION OF THE PREFERRED EMBODIMENTS

The invention is more particularly described in the context of a locking system for fan cowls of an aircraft nacelle attached beneath a pylon of said aircraft. The fan cowls are mounted such that they can rotate about an opening axis which is parallel to the axis of the nacelle, and on either side of the pylon.

Figure 2:
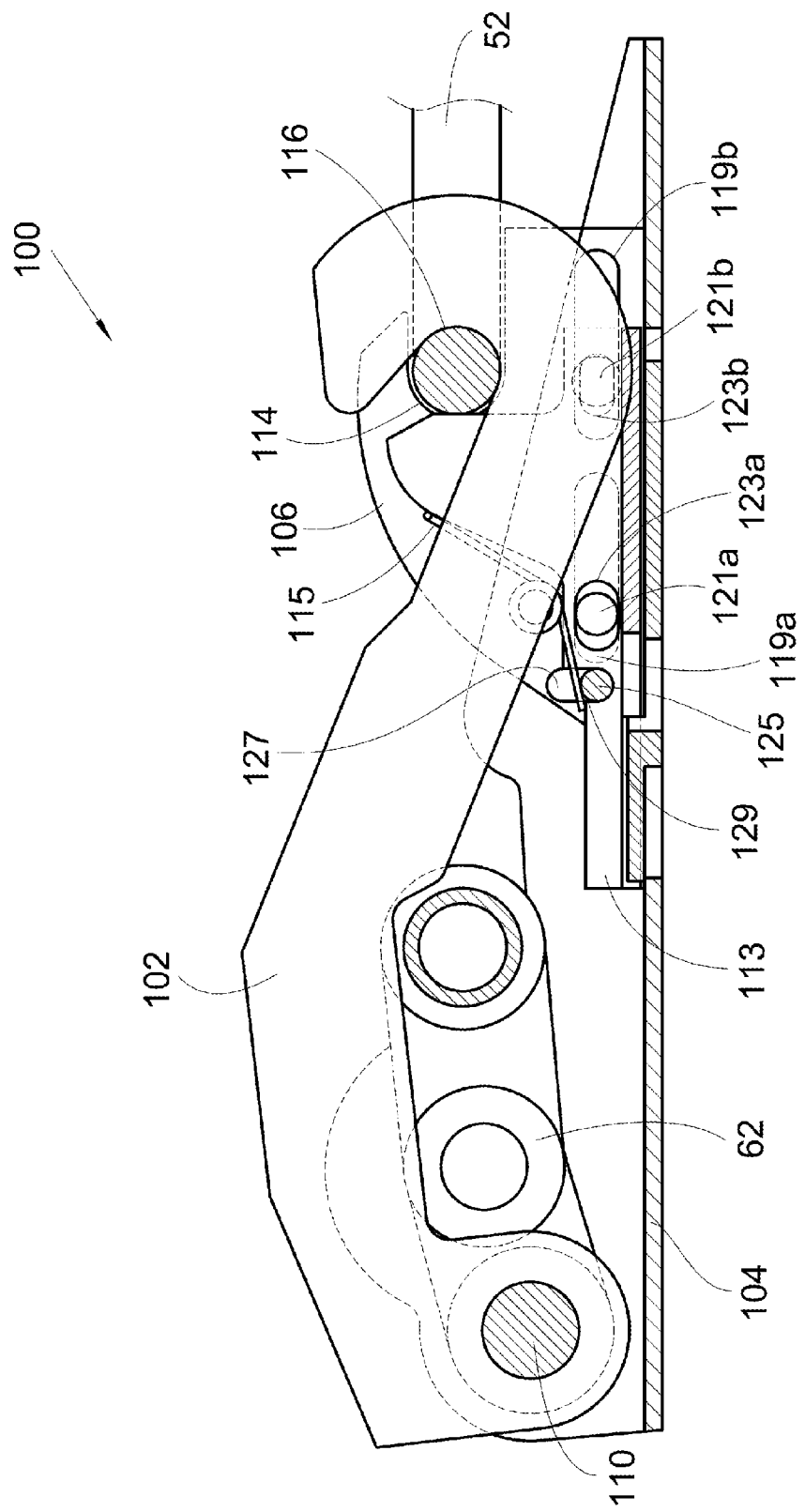
FIG. 2 shows the locking system according to the invention in the engaged and locked position.

FIG. 2 shows a locking system 100 which is designed to lock two structures, in particular the lower edges of the two fan cowls, the first of which has a latching point 52.

The lower edge of the second fan cowl has an articulation 62 which in this case consists of two articulated rods which are able to rotate with respect to one another, and of which the first is mounted so as to be able to rotate on the lower edge of the second fan cowl, the second bearing the locking system 100.

Figure 1:
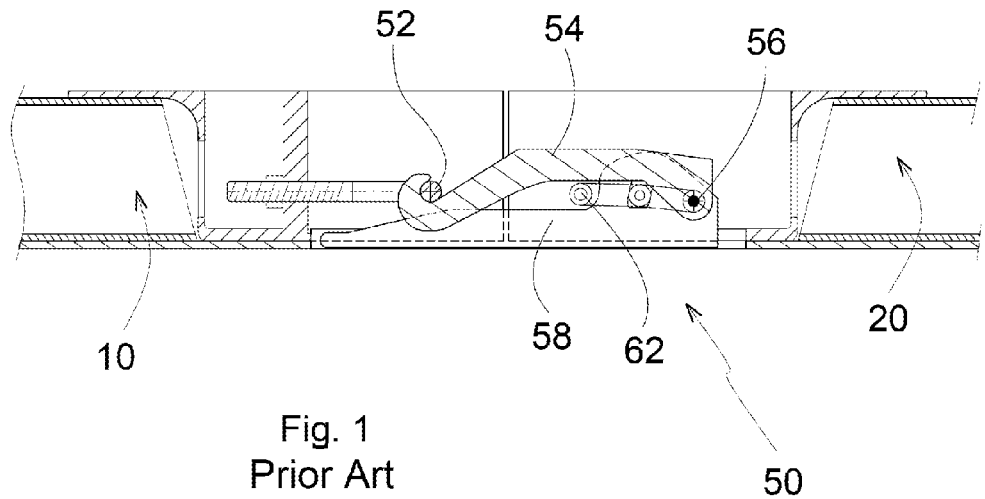
FIG. 1 is a schematic representation in section of a locking system of the prior art.

The locking system 100 comprises a hook 102 (which is seen in FIG. 1, in section on a median plane of the locking system 100) and a handle 104.

The hook 102 is mounted on the handle 104 and secured in rotation therewith about an operating spindle 110 parallel with the opening axis and the handle 104 is mounted on the second articulated rod of the articulation 62 such that it can rotate about the operating spindle 110.

The hook 102 has a throat 116 in which, in the engaged position, the latching point 52 engages, which corresponds to a locked position of the handle 104.

The handle 104 can thus move between the locked position which locks the two fan cowls to one another and in which the latching point 52 is engaged in the hook 102, and an unlocked position in which the two fan cowls are de-secured and in which the latching point 52 is not engaged in the hook 102.

The locking system 100 comprises a key 120 which is associated with the hook 102 and by means of which it is possible to pass from the locked position to the unlocked position of the handle 104, wherein the key 120 can be removed when the handle 104 is in the locked position and cannot be removed when the handle 104 is in the unlocked position.

"Associated" means that the hook 102 can move only if the key 120 is present and an operator acts on the key 120.

"Can be removed" means that the key 120 can be withdrawn only by the action of an operator and "cannot be removed" means that the key 120 cannot be withdrawn, even by an operator.

Thus, while the locking system 100 is not engaged and locked, the key 120 remains visible to the operator.

Figure 10:
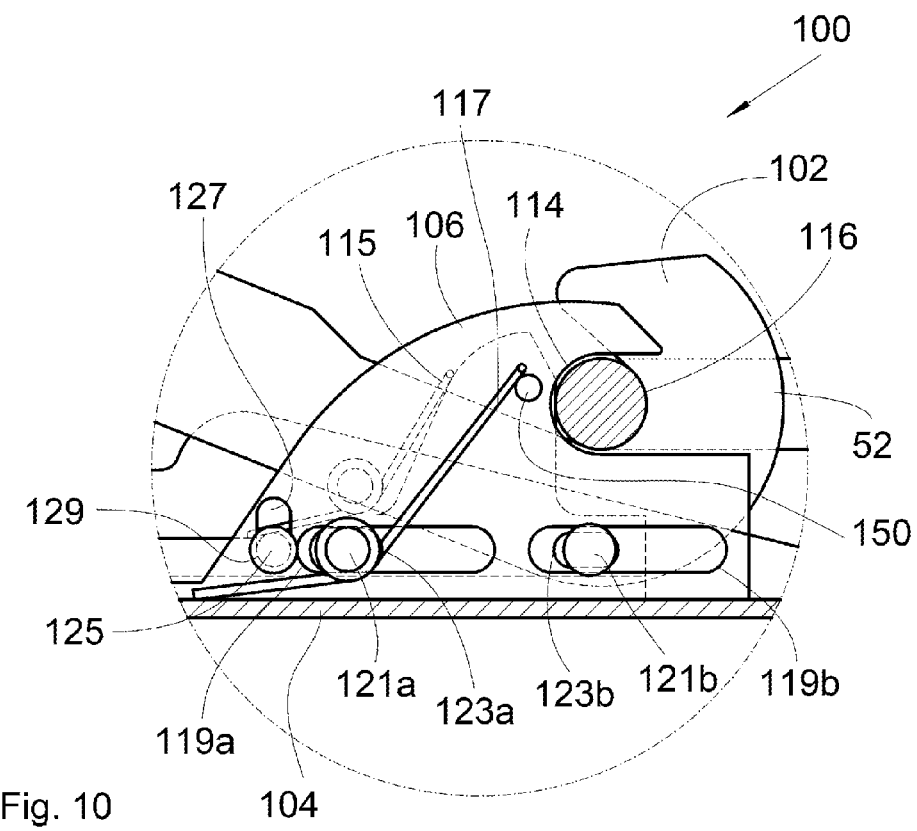
FIG. 10 shows a partial view of the locking system.

Here, the locking system 100 comprises a counter-hook 106, a blocking plate 113, a first return means or member 115 and a second return means or member 117 (FIG. 10).

The counter-hook 106 is mounted on the handle 104 such that it can move in translation and has a counter-throat 114.

FIG. 2 shows the counter-hook 106 in the locked position in which the counter-throat 114 is placed facing the throat 116 in the engaged position, such that the latching point 52 is received in the counter-throat 114 and is thus sandwiched between the throat 116 and the counter-throat 114, the handle 104 is then in the locked position.

Figure 3:
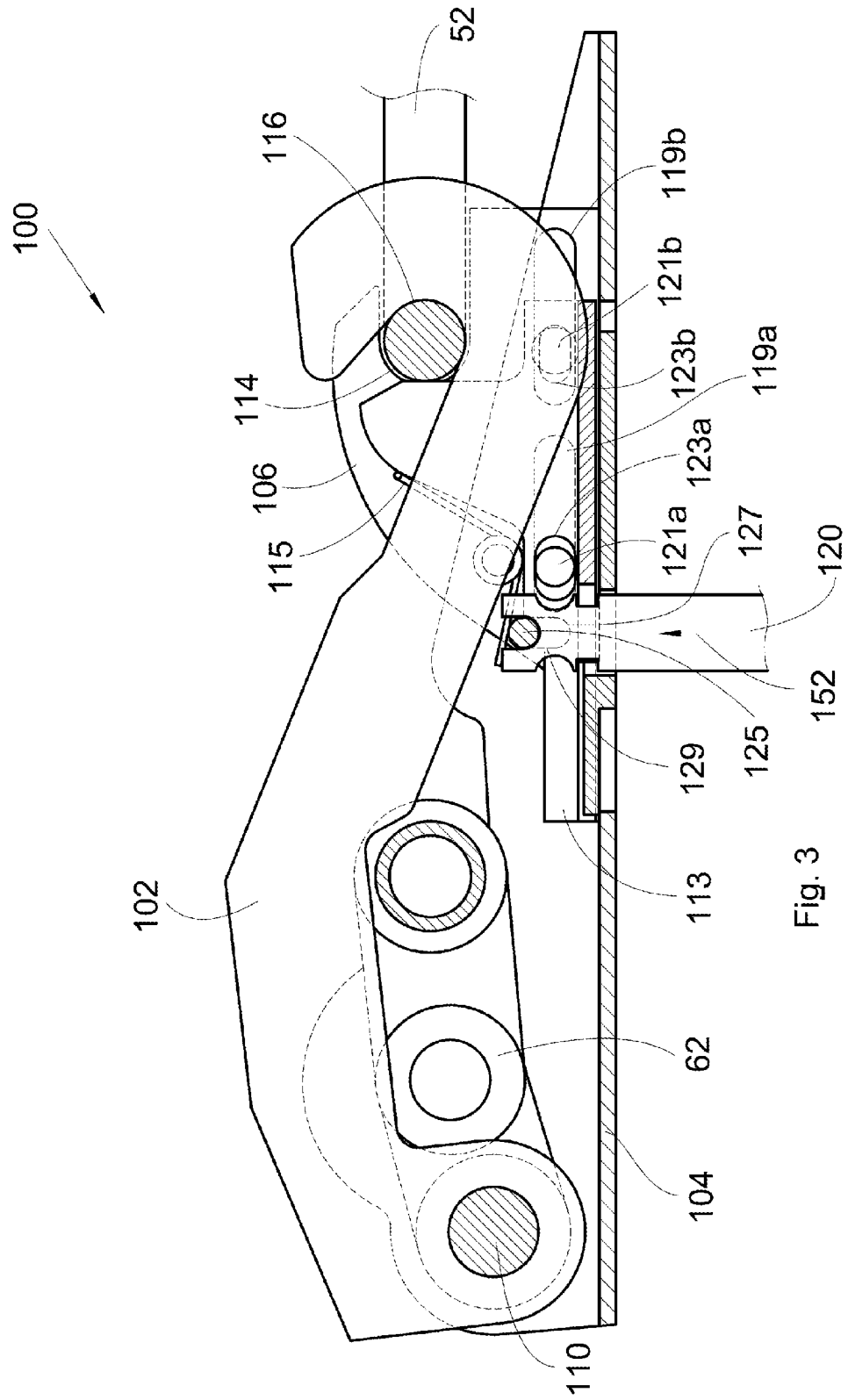
FIG. 3 shows a step of unlocking the locking system.

FIG. 3 shows the counter-hook 106 in the unlocked position in which the counter-throat 114 is remote from the latching point 52, allowing the handle 104 to rotate from the locked position to the unlocked position.

Figure 7:
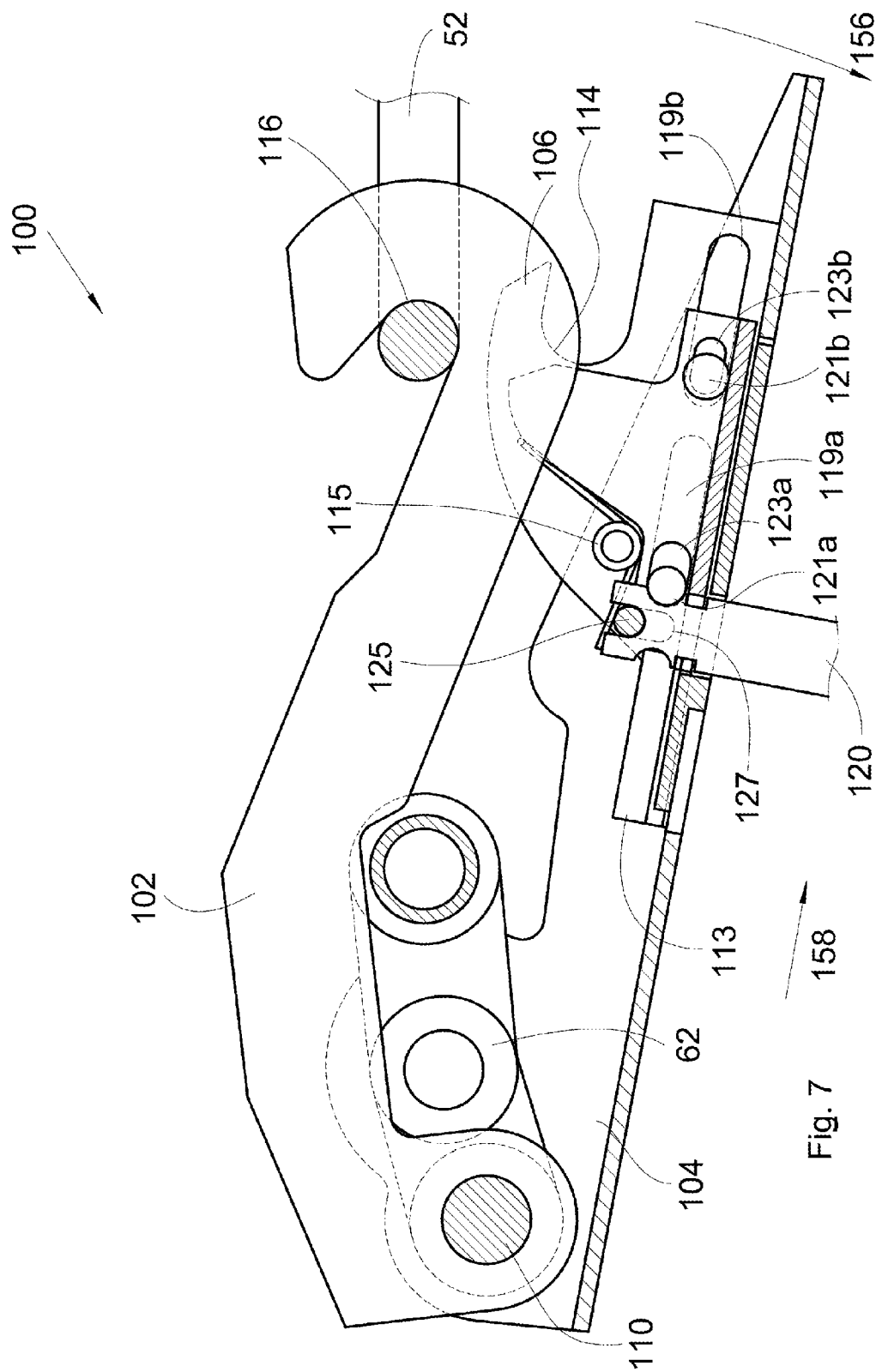
FIG. 7 shows the locking system in the position in which the key is blocked.

FIG. 7 shows the counter-hook 106 in the passing position which is distinct from the locked position and from the unlocked position and in which the counter-hook 106 occupies a space in which the latching point 52 engages in the engaged position, that is to say when the handle 104 is in the locked position.

The passing position is beyond the locked position, with respect to the unlocked position.

Translation is effected here by means of two bars 121*a-b* which are secured to the handle 104 and to oblong holes 119*a-b* which are created in the counter-hook 106 and whose longitudinal axes are parallel to the translation direction. The bars 121*a-b* are fitted into the oblong holes 119*a-b* which move along the two bars 121*a-b*. In order to ensure the stability of the counter-hook 106, there are two pairs of holes 119*a-b* distributed on either side of the median plane.

FIG. 10 shows the second return means 117 which forces the counter-hook 106 into the passing position. Here, the second return means 117 takes the form of a torsion spring which is fitted onto the bar 121*a* and whose arms bear respectively against the handle 104 and against the counter-hook 106, in this case via the intermediary of a peg 150.

The blocking plate 113 is mounted on the handle 104 such that it can move in translation in a direction parallel to the translation direction of the counter-hook 106.

Translation is effected here too by oblong holes 123*a-b* which are created in the blocking plate 113 and which move along the two bars 121*a-b*. In order to ensure the stability of the blocking plate 113, there are also two pairs of holes 123*a-b* distributed on either side of the median plane.

FIGS. 2 and 3 show the blocking plate 113 in the free position in which it is in contact against the latching point 52 in the engaged position, that is to say when the handle 104 is in the locked position.

Figure 6:
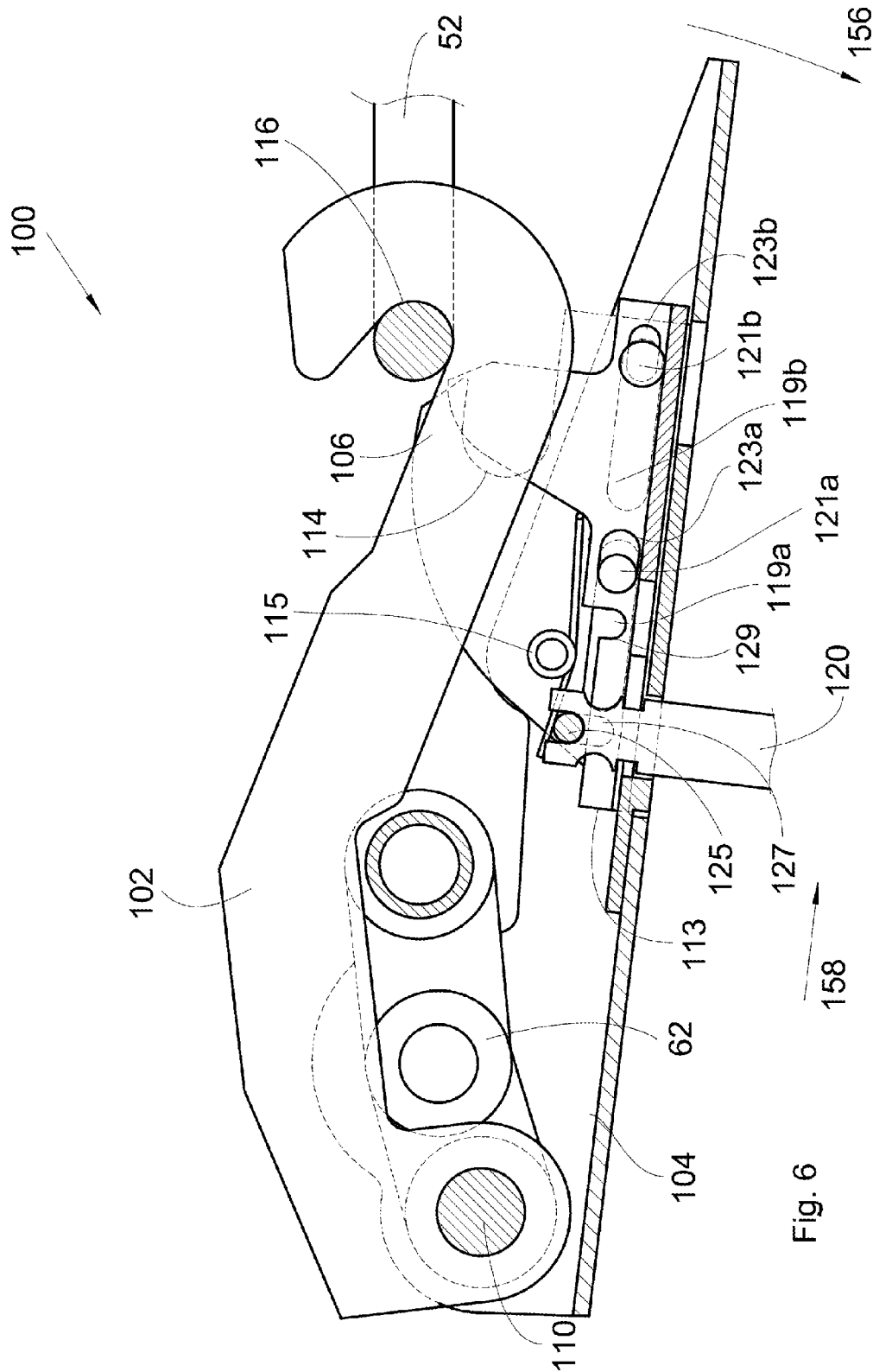
FIG. 6 shows the locking system in a blocking position.
Figure 8:
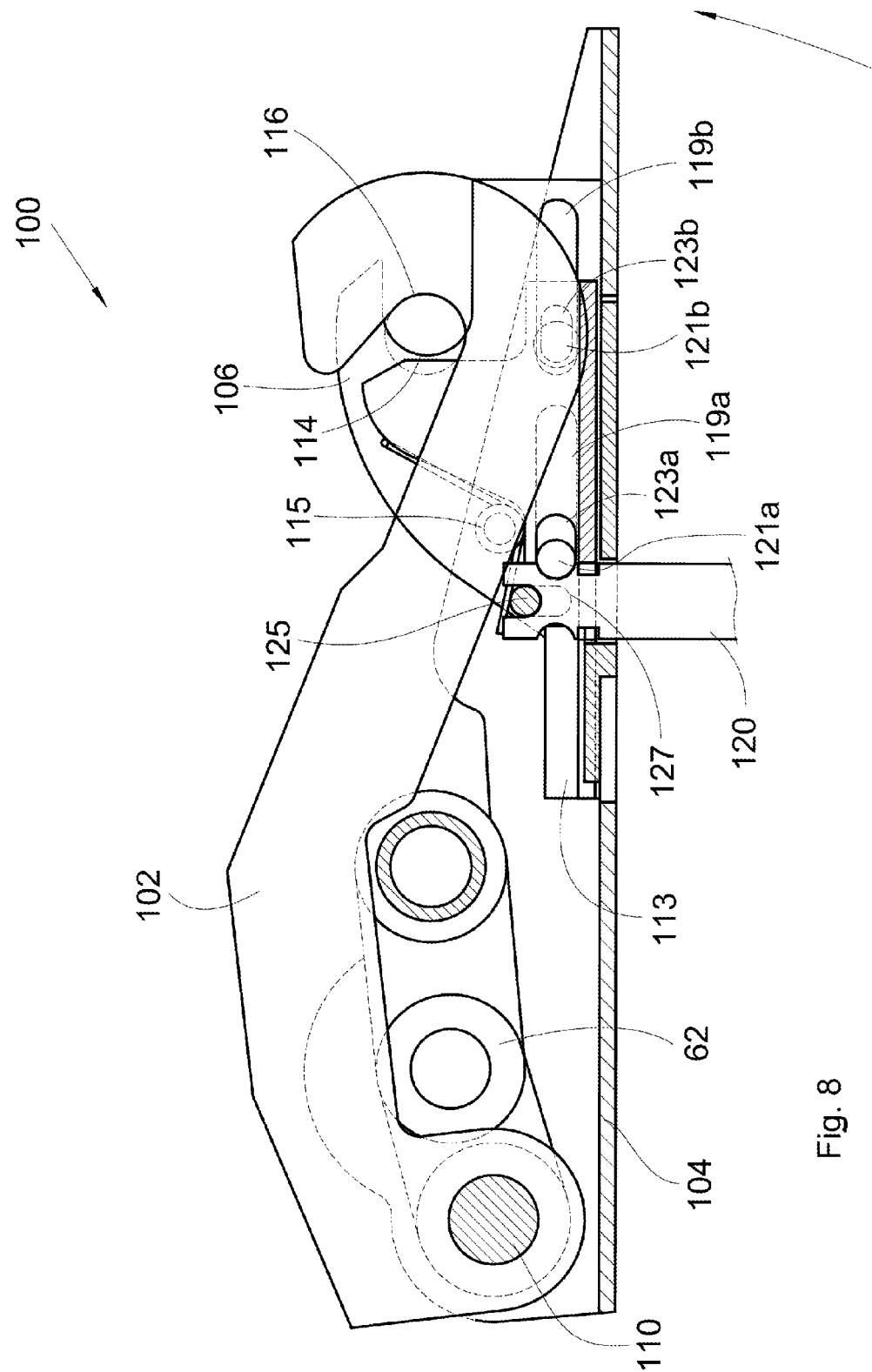
FIG. 8 shows the locking system in the position in which it is disengaged and the key is blocked.

FIGS. 6 to 8 show the blocking plate 113 in the blocking position in which, the handle 104 having been maneuvered, the blocking plate 113 is no longer in contact against the latching point 52 and has moved so as to occupy the space in which the latching point 52 engages when in the engaged position, and thus when the handle 104 is in the locked position, which essentially corresponds to the passing position of the counter-hook 106.

The first return means 115 forces the blocking plate 113 into the blocking position. Here, the first return means 115 takes the form of a torsion spring which is fitted onto a peg of the counter-hook 106 and whose arms bear respectively against the blocking plate 113 and against the counter-hook 106, in this case via the intermediary of a blocking peg 125.

The blocking peg 125 is mounted on the counter-hook 106 such that it can move in translation in an unblocking direction which is in this case perpendicular to the translation direction. Here, the blocking peg 125 is mounted in an oblong slot 127 of the counter-hook 106.

This blocking peg 125 is able to move between a resting position (FIG. 2) in which it is received in a resting recess 129 created in the blocking plate 113 and an actuation position (FIG. 3) in which it is no longer received in the resting recess 129.

A return means or member, which is in this case the first return means 115, forces the blocking peg 125 into the resting position.

The key 120 is provided so as to move the blocking peg 125 from the resting position to the actuation position in the unblocking direction and to cause the counter-hook 106 to pass from the locked position to the unlocked position by moving along the translation direction.

The locking system 100 further comprises blocking means provided so as to prevent the key 120 from being removed when the blocking peg 125 is in the actuation position and the counter-hook 106 is in the unlocked position, and to allow the key 120 to be removed when the counter-hook 106 is in the locked position.

Figure 9:
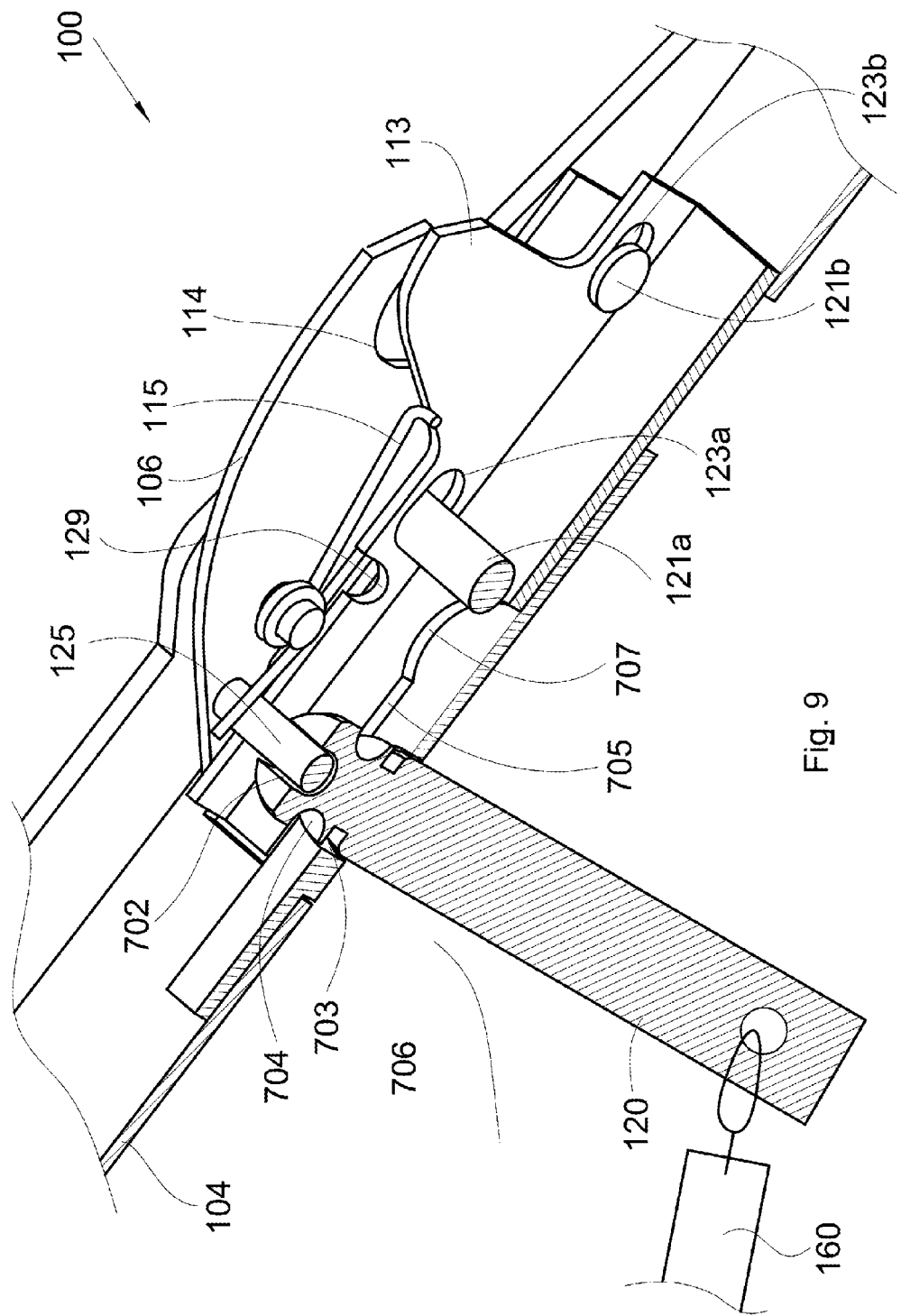
FIG. 9 shows another view of the locking system.

FIG. 9 shows another view of the locking system 100.

The counter-hook 106 has a bore 703 which is arranged in line with the blocking peg 125 and which allows the key 120 to be introduced in the unblocking direction.

The blocking plate 113 has a slot 705 which is parallel to the translation direction and is delimited by two edges which are separated by a distance of less than the transverse dimension of the key 120. The slot 705 ends in an eye 707 which is placed facing the bore 703 when the blocking plate 113 is in the free position and whose dimensions allow the key 120 to be introduced.

The key 120 comprises:

at its end, a first concave recess 702 which is designed to receive the blocking peg 125 in the actuation position and which takes the form here of a half-cylinder, below the first recess 702, a second concave recess 704 which is designed to receive a fixed element of the handle 104 when the counter-hook 106 is in the passing position and the blocking plate 113 is in the blocking position, the fixed element is in this case the bar 121*a* and the second recess 704 takes the form here of a toroidal groove, below the second recess 704, a third concave recess 706 which is designed to receive the two separated edges of the slot 705 when the counter-hook 106 leaves the locked position, and which takes the form here of a parallelepipedal groove.

The blocking means thus comprise the bore 703, the slot 705, the first recess 702, the second recess 704 and the third recess 706.

The operation of the locking system 100 from an engaged and locked position (FIG. 2), in which the latching point 52 is gripped between the throat 116 and the counter-throat 114, the blocking plate 113 is in the free position, the blocking peg 125 is in the resting position, and the eye 707 and the bore 703 are aligned facing the blocking peg 125, is as follows:

an operator introduces the key 120 (FIG. 3) in the unblocking direction (arrow 152) through the eye 707 and the bore 703 in the unblocking direction, such that the first recess 702 moves the blocking peg 125 into the actuation position, the operator moves the key 120 in translation (FIG. 4) in a first sense along the translation direction (arrow 154) and thereby moves the counter-hook 106 in translation toward the unlocked position; in the course of this movement, the two separated edges of the slot 705 are received in the third recess 706, the key 120 can then no longer be withdrawn, the operator then rotates the handle 104 about the operating spindle 110, as shown by the arrow 156 (FIG. 5), until the blocking plate 113 is no longer in contact with the latching point 52, once the blocking plate 113 is no longer in contact with the latching point 52 (FIG. 6), the first return means 115 forces the blocking plate 113 into the blocking position by moving in a second sense along the translation direction (arrow 158), the key 120 may then be released (FIG. 7) and the second return means 117 forces the counter-hook 106 into the passing position by moving it in the second sense along the translation direction (arrow 158), which also causes the key 120 to be moved and the bar 121*a* to be placed in the second recess 704, which prevents the key 120 from being withdrawn and the blocking peg 125 from returning to the resting position, and the latching point 52 may then be disengaged from the hook 102.

Thus, even if the handle 104 is put back into position (FIG. 8) while the latching point 52 is absent, the key 120 may not be withdrawn and thus alerts the operator to improper engagement and locking.

Figure 4:
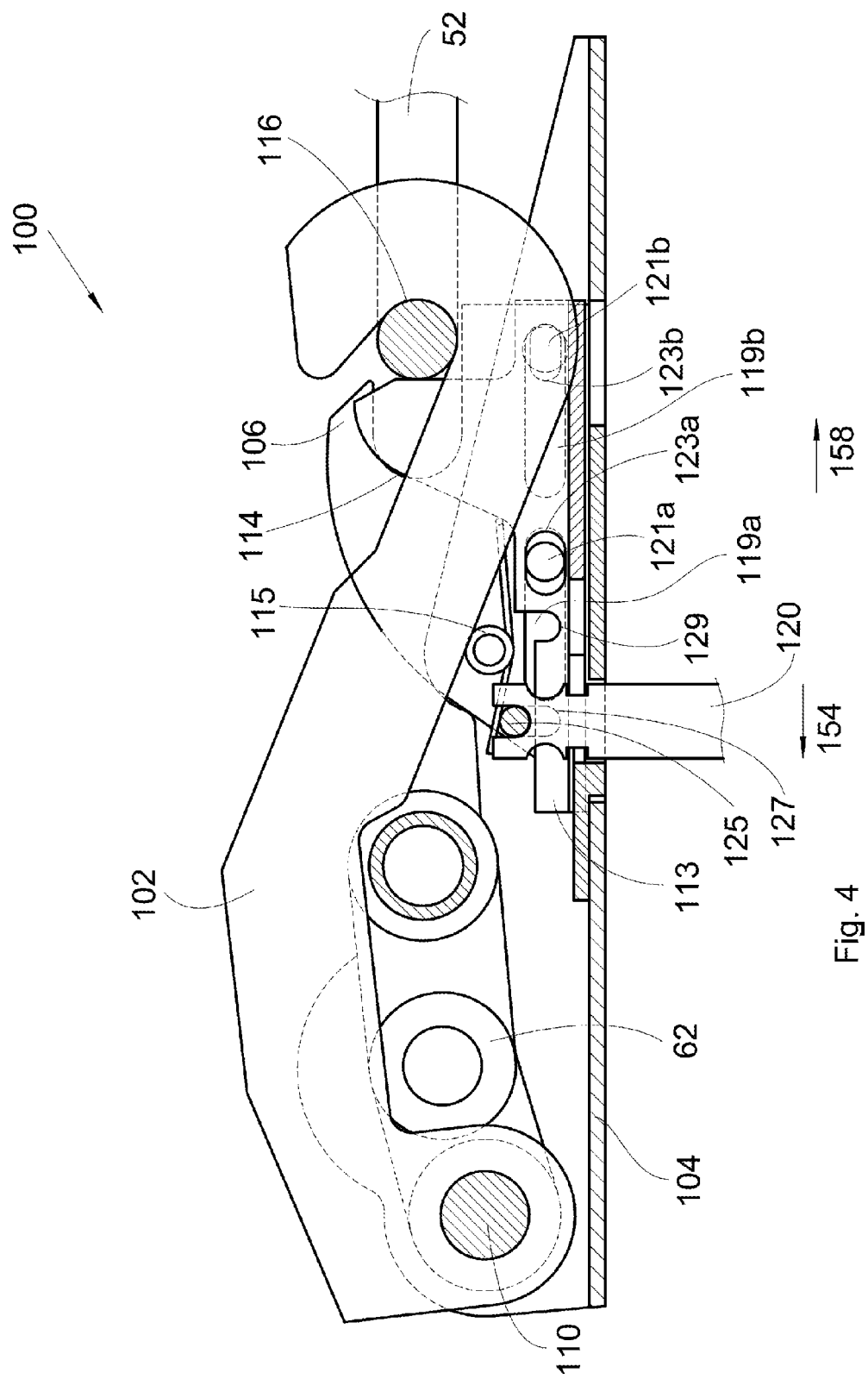
FIG. 4 shows the locking system in the engaged and unlocked position.
Figure 5:
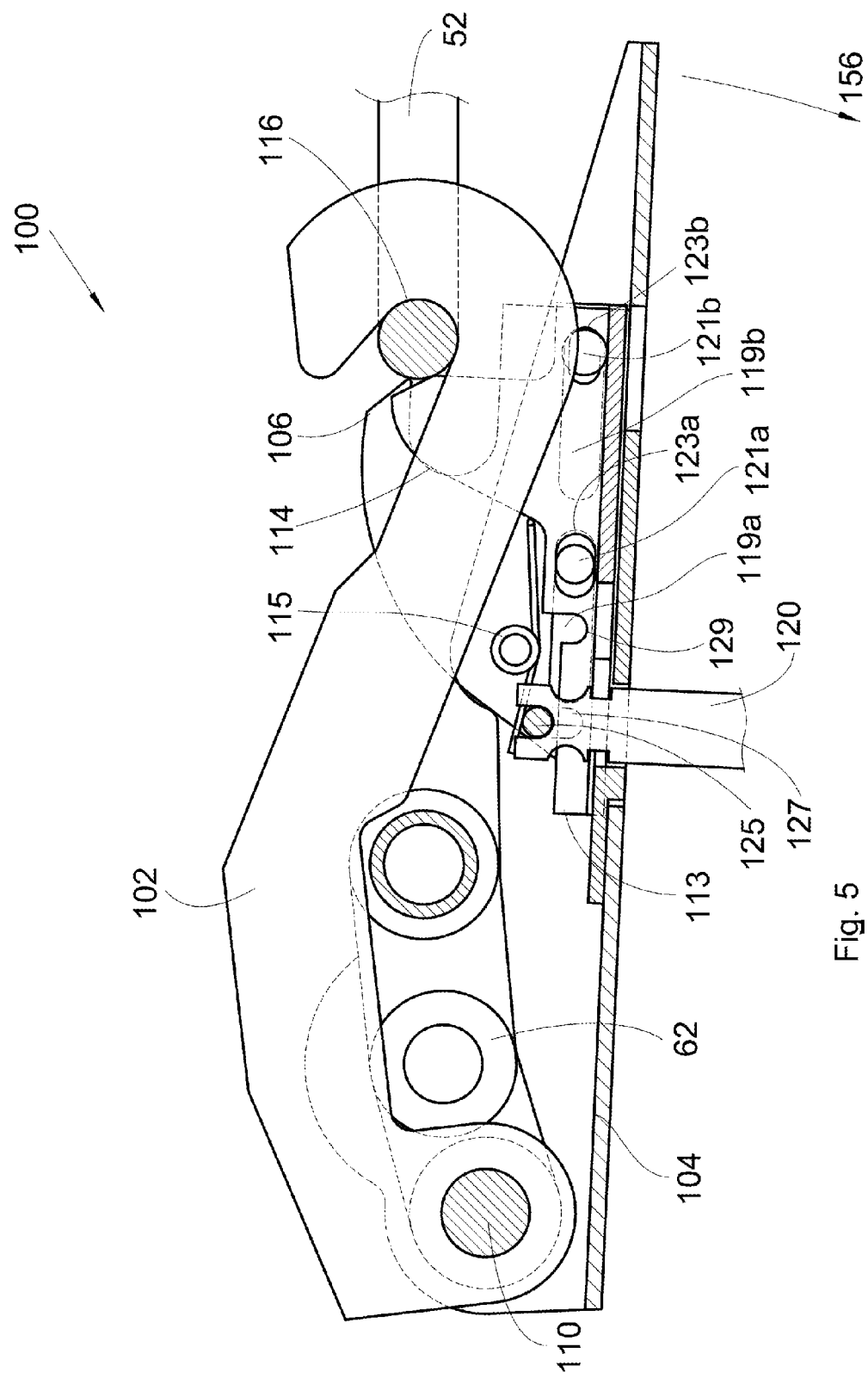
FIG. 5 shows the locking system during the maneuver to disengage it.

The operation of the locking system 100 from a disengaged and unlocked position (which corresponds to FIG. 7 without the latching point 52) is as follows:

the operator moves the key 120 in the first sense along the translation direction (154) such that the counter-hook 106 is in the unlocked position, the operator engages the latching point 52 in the hook 102, the operator pivots the handle 104 in the direction counter to that of the arrow 156, such that the blocking plate 113 (which corresponds to FIG. 6) encounters the latching point 52 and moves under this force toward the free position; to that end, the blocking plate 113 has a sloping edge along which the latching point 52 slides as the handle pivots, the locking system 100 is then in the position of FIG. 4, the operator may then let go of the key 120 which moves in the second sense along the translation direction (arrow 158) and the counter-hook 106 is positioned in the locked position (FIG. 3), and the operator may then withdraw the key 120 in the direction counter to the unblocking direction (arrow 152).

In order to increase visibility for the operator, a pennant 160 (FIG. 9) may be attached to the key 120.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. A locking system comprising:
   a handle mounted so as to be rotatable about an operating spindle, wherein the handle can move between a locked position and an unlocked position,
   a hook mounted on the handle and secured in rotation therewith, wherein the hook has a throat designed and arranged to receive a latching point of a structure when the handle is in the locked position,
   a key associated with the hook and via which it is possible to pass from the locked position to the unlocked position of the handle, wherein the key can be removed when the handle is in the locked position and cannot be removed when the handle is in the unlocked position,
   a counter-hook having a counter-throat and being mounted on the handle such that it can move in translation, in a translation direction, between a locked position in which the latching point is sandwiched between the counter-throat and the throat when the handle is in the locked position, an unlocked position in which the counter-throat is remote from the latching point allowing the handle to rotate from the locked position to the unlocked position, and a passing position which is distinct from the locked position and from the unlocked position, and in which the counter-hook occupies a space in which the latching point engages when the handle is in the locked position,
   a blocking plate mounted on the handle such that it can move in translation, in the translation direction, between a free position in which the blocking plate is in contact against the latching point when the handle is in the locked position, and a blocking position in which the blocking plate occupies a space in which the latching point engages when the handle is in the locked position, wherein the blocking plate comprises a resting recess,
   a blocking peg mounted on the counter-hook such that it can move in translation, in an unblocking direction, between a resting position in which it is received in the resting recess and an actuation position in which it is not received in the resting recess, and
   wherein the key is configured so as to engage with the blocking peg so as to cause the blocking peg to pass from the resting position to the actuation position and to cause the counter-hook to pass from the locked position to the unlocked position, and
   wherein the locking system further comprises a blocking member configured so as to prevent the key from being removed when the blocking peg is in the actuation position and the counter-hook is in the unlocked position, and to allow the key to be removed when the counter-hook is in the locked position.

2. The locking system as claimed in claim 1, further comprising:
a first return member arranged to force the blocking plate into the blocking position and the blocking peg into the resting position, and
a second return member arranged to force the counter-hook into the passing position.

3. The locking system as claimed in claim 2, wherein the blocking peg is forced into the resting position by the first return member.

4. The locking system as claimed in claim 1, wherein the passing position is beyond the locked position, with respect to the unlocked position.

5. The locking system as claimed in claim 1, wherein the blocking member comprises:
a bore created in the counter-hook, in line with the blocking peg,
a slot created in the blocking plate, parallel to the translation direction and delimited by two separated edges and ending in an eye provided such that it is placed facing the bore when the blocking plate is in the free position,
on the key:
at its end, a first concave recess designed to receive the blocking peg in the actuation position,
below the first recess, a second concave recess designed to receive a fixed element of the handle when the counter-hook is in the passing position and the blocking plate is in the blocking position,
below the second recess, a third concave recess designed to receive the two separated edges when the counter-hook leaves the locked position.

6. An aircraft nacelle comprising:
two fan cowls mounted such that they can rotate about an opening axis which is parallel to the axis of the nacelle,
wherein the first fan cowl has a latching point and a locking system comprising:
a handle mounted so as to be rotatable about an operating spindle, wherein the handle can move between a locked position and an unlocked position,
a hook mounted on the handle and secured in rotation therewith, wherein the hook has a throat designed and arranged to receive a latching point of a structure when the handle is in the locked position,
a blocking plate mounted on the handle and configured to move in translation between a free position and a blocking position,
a key associated with the hook and via which it is possible for the handle to pass from the locked position to the unlocked position, wherein the key can be removed when the handle is in the locked position and the blocking plate is in free position and cannot be removed when the handle is in the unlocked position and the blocking plate is in the blocking position,
the handle being mounted such that it is rotatable on the second fan cowl about the operating spindle which is parallel to the opening axis.

7. An aircraft comprising a pylon beneath which is attached a nacelle as claimed in claim 6.

8. The aircraft nacelle of claim 6 further comprising:
a counter-hook having a counter-throat and being mounted on the handle such that it can move in translation, in a translation direction, between a locked position in which the latching point is sandwiched between the counter-throat and the throat when the handle is in the locked position, an unlocked position in which the counter-throat is remote from the latching point allowing the handle to rotate from the locked position to the unlocked position, and a passing position which is distinct from the locked position and from the unlocked position, and in which the counter-hook occupies a space in which the latching point engages when the handle is in the locked position,
a resting recess in the blocking plate, wherein in the free position the blocking plate is in contact against the latching point when the handle is in the locked position, and in the blocking position the blocking plate occupies a space in which the latching point engages when the handle is in the locked position,
a blocking peg mounted on the counter-hook such that it can move in translation, in an unblocking direction, between a resting position in which it is received in the resting recess and an actuation position in which it is not received in the resting recess, and
wherein the key is configured so as to engage with the blocking peg so as to cause the blocking peg to pass from the resting position to the actuation position and to cause the counter-hook to pass from the locked position to the unlocked position.

9. The aircraft nacelle as claimed in claim 8, further comprising:
a first return member arranged to force the blocking plate into the blocking position and the blocking peg into the resting position, and
a second return member arranged to force the counter-hook into the passing position.

10. The aircraft nacelle as claimed in claim 9, wherein the blocking peg is forced into the resting position by the first return member.

11. The aircraft nacelle as claimed in claim 6, wherein the passing position is beyond the locked position, with respect to the unlocked position.

12. The aircraft nacelle as claimed in claim 6, wherein the blocking member comprises:
a bore created in the counter-hook, in line with the blocking peg,
a slot created in the blocking plate, parallel to the translation direction and delimited by two separated edges and ending in an eye provided such that it is placed facing the bore when the blocking plate is in the free position,
on the key:
at its end, a first concave recess designed to receive the blocking peg in the actuation position,
below the first recess, a second concave recess designed to receive a fixed element of the handle when the counter-hook is in the passing position and the blocking plate is in the blocking position,
below the second recess, a third concave recess designed to receive the two separated edges when the counter-hook leaves the locked position.

13. A locking system comprising:
a handle rotateably mounted about an operating spindle and configured to move between a locked position and an unlocked position,
a hook secured to the handle and configured to rotate about the operation spindle, wherein the hook comprises a throat configured to engage a latching point of a structure when the handle is in the locked position,
a key associated with the hook and configured to allow the handle to pass from the locked position to the unlocked position, wherein the key is only removable from the locking system when the handle is in the locked position, a counter-hook having a counter-throat and being mounted on the handle and configured to move in a translation direction between a locked position in which the latching point is sandwiched between the counter-throat and the throat when the handle is in the locked position, an unlocked position in which the counter-throat is remote from the latching point allowing the handle to rotate from the locked position to the unlocked position, and a passing position which is distinct from the locked position and from the unlocked position, and in which the counter-hook occupies a space in which the latching point engages when the handle is in the locked position, a blocking plate mounted on the handle and configured to move in the translation direction between a free position in which the blocking plate is in contact against the latching point when the handle is in the locked position and a blocking position in which the blocking plate occupies a space in which the latching point engages when the handle is in the locked position.

14. The locking system as claimed in claim 13 wherein the blocking plate comprises a resting recess, and further comprising:

a blocking peg mounted on the counter-hook and configured to move in an unblocking direction between a resting position in which the blocking peg is received in the resting recess and an actuation position in which the blocking peg is not received in the resting recess, and wherein the key is configured so as to engage with the blocking peg so as to cause the blocking peg to pass from the resting position to the actuation position and to cause the counter-hook to pass from the locked position to the unlocked position.

15. The locking system as claimed in claim 14, further comprising:

a first return member arranged to force the blocking plate into the blocking position and the blocking peg into the resting position, and a second return member arranged to force the counter-hook into the passing position.

16. The locking system as claimed in claim 15, wherein the blocking peg is forced into the resting position by the first return member.

17. The locking system as claimed in claim 13, wherein the passing position is beyond the locked position, with respect to the unlocked position.

18. The locking system as claimed in claim 14, wherein the locking system further comprises a blocking member configured so as to prevent the key from being removed when the blocking peg is in the actuation position and the counter-hook is in the unlocked position, and to allow the key to be removed when the counter-hook is in the locked position.

19. The locking system as claimed in claim 18, wherein the blocking member comprises:

a bore created in the counter-hook, in line with the blocking peg, a slot created in the blocking plate, parallel to the translation direction and delimited by two separated edges and ending in an eye provided such that it is placed facing the bore when the blocking plate is in the free position, on the key:

at its end, a first concave recess designed to receive the blocking peg in the actuation position, below the first recess, a second concave recess designed to receive a fixed element of the handle when the counter-hook is in the passing position and the blocking plate is in the blocking position, below the second recess, a third concave recess designed to receive the two separated edges when the counter-hook leaves the locked position.

\* \* \* \* \*